United States Patent [19]

Shaefer et al.

[11] Patent Number: 4,514,244

[45] Date of Patent: Apr. 30, 1985

[54] PLASTIC PIPE ELEMENTS AND METHODS FOR MAKING SAME

[75] Inventors: Robert R. Shaefer; Kenneth J. Matthews, both of Louisville, Ky.

[73] Assignee: Nibco Inc., Elkart, Ind.

[21] Appl. No.: 588,703

[22] Filed: Mar. 12, 1984

Related U.S. Application Data

[62] Division of Ser. No. 303,757, Sep. 21, 1981, Pat. No. 4,457,542.

[51] Int. Cl.³ .................. B29C 27/14; F16L 47/02
[52] U.S. Cl. ............................ 156/158; 156/213; 156/215; 156/258; 156/294; 156/304.2; 156/304.3; 156/304.5; 156/304.6; 156/307.1; 285/55; 285/156; 285/177; 285/179; 285/398; 285/405
[58] Field of Search ............... 156/158, 258, 213, 215, 156/294, 304.2, 304.3, 304.5, 304.6, 307.1; 285/55, 156, 177, 179, 398, 405

[56] References Cited

U.S. PATENT DOCUMENTS

| | | | |
|---|---|---|---|
| 2,878,038 | 3/1959 | Noland | 285/55 |
| 3,002,871 | 10/1961 | Tramm et al. | 156/73 |
| 3,540,223 | 11/1970 | Ebbe | 61/12 |
| 3,561,795 | 2/1971 | Becher | 285/55 |
| 3,666,586 | 5/1972 | Lacey | 156/294 |
| 3,873,391 | 3/1975 | Planka et al. | 156/304.3 |
| 3,975,039 | 8/1976 | Penneck et al. | 285/156 |
| 4,043,857 | 8/1977 | Byrne et al. | 156/198 |
| 4,257,630 | 3/1981 | Bartell et al. | 285/21 |
| 4,430,285 | 2/1984 | Runyan et al. | 264/242 |

FOREIGN PATENT DOCUMENTS

| | | |
|---|---|---|
| 164658 | 8/1955 | Australia . |
| 1335488 | 7/1963 | France . |

Primary Examiner—Michael Wityshyn
Attorney, Agent, or Firm—Price, Heneveld, Huizenga & Cooper

[57] ABSTRACT

A plastic pipe element comprises an inner one-piece liner of thermoplastic material. The liner is formed so as to include at least one cylindrical leg having a free outer end and inner end disposed intermediate opposite ends of the liner. At least one pipe section is formed comprising an inner thermoplastic lining and a fiber reinforced outer layer. That pipe section is bonded to an outer surface of the cylindrical leg such that an inner end edge of the pipe section overlies the liner. A sheet of fiber reinforced thermosetting resin molding compound is applied externally around the inner end edge of the pipe section and is subjected to pressure and heat to form the sheet into a desired shape. Thereafter, the sheet is allowed to harden. Elements formed in this manner include a T-fitting, a pipe flange, a 90° fitting, a reducer fitting, a 45° fitting, and a pipe cap.

21 Claims, 9 Drawing Figures

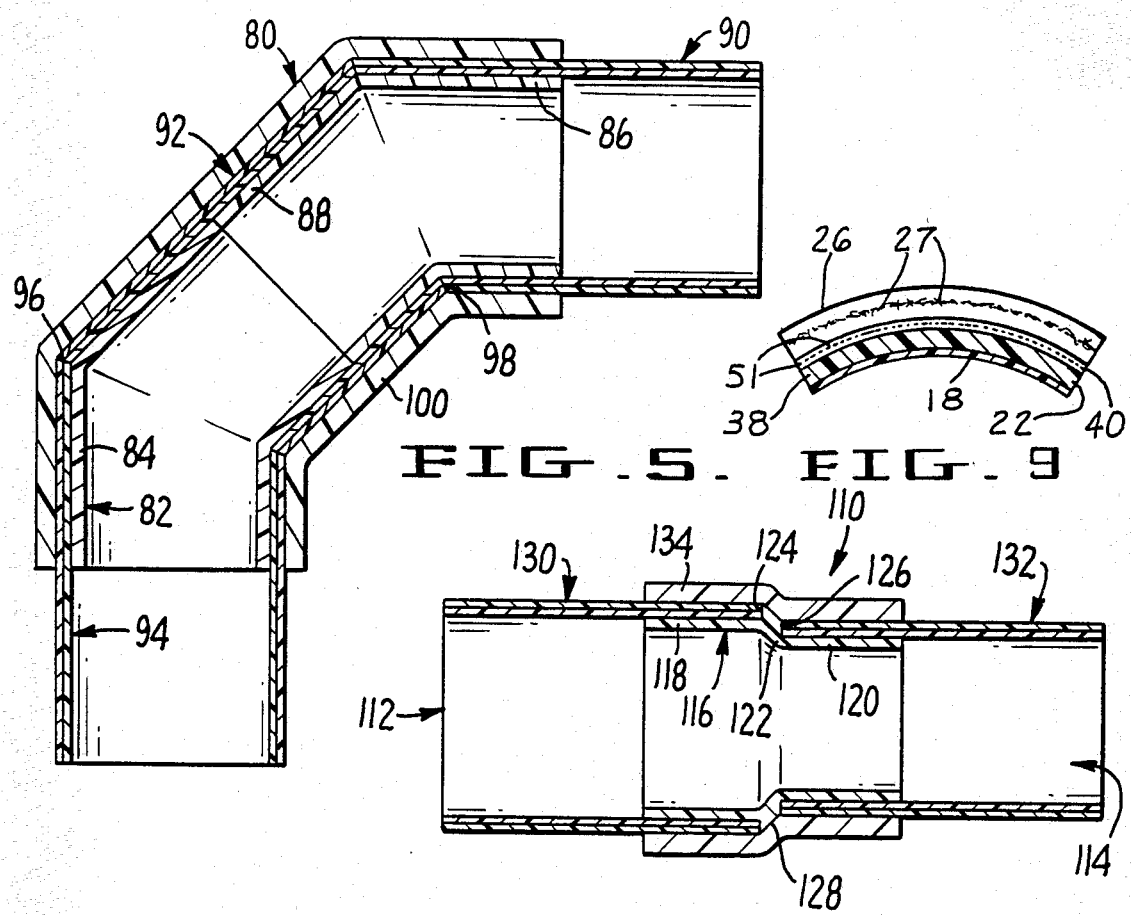
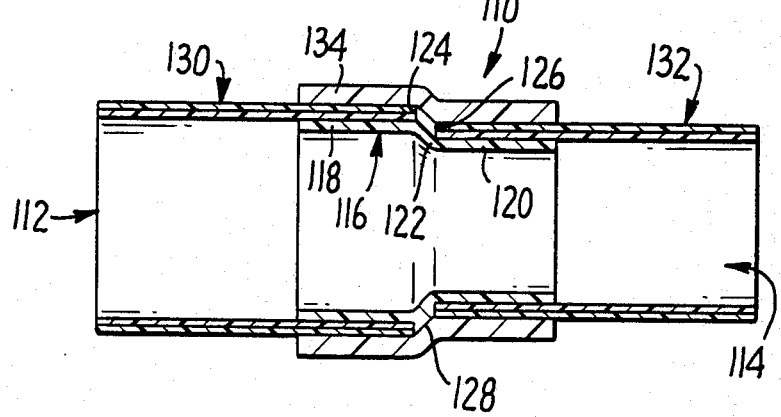
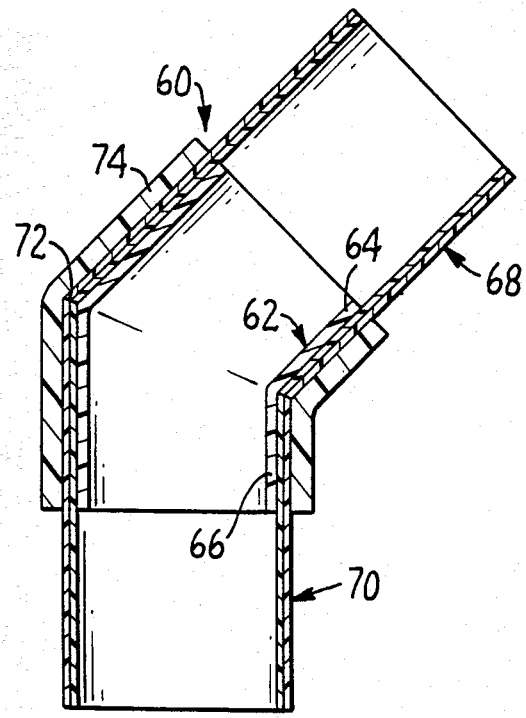
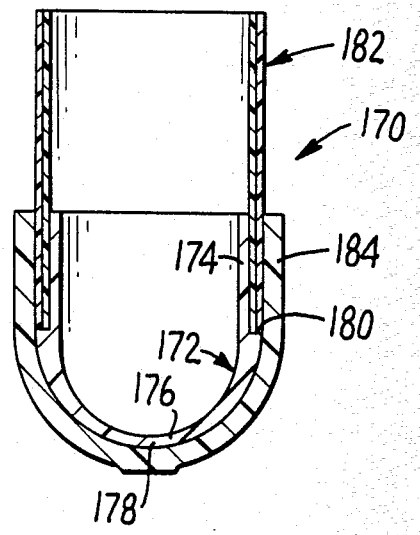

PLASTIC PIPE ELEMENTS AND METHODS FOR MAKING SAME

This is a division of application Ser. No. 303,757, filed Sept. 21, 1981, now U.S. Pat. No. 4,457,542.

BACKGROUND AND OBJECTS OF THE INVENTION

The present invention relates to plastic piping and in particular, to reinforced composite pipe elements.

Plastic pipe elements, such as fittings, flanges, and caps, for example, have heretofore been fabricated using various techniques intended to provide a high-strength element presenting a continuous fluid-conducting surface which is resistant to chemical attack by the fluid being conducted. It has been proposed to form a fitting by molding such that the internal fluid-conducting portion thereof is a continuous and uninterrupted surface (no joints), but such a molding technique is relatively expensive. Additional techniques are disclosed in the following U.S. patents: U.S. Pat. No. 4,047,741 issued to Pertriaux on Sept. 13, 1977; U.S. Pat. No. 3,873,391 issued to Plauka et al on Mar. 25, 1975; U.S. Pat. No. 3,458,619 issued to Prochaska on July 29, 1969; U.S. Pat. No. 2,503,882 issued to Medford on Apr. 11, 1950; U.S. Pat. No. 2,878,038 issued to Noland on Mar. 17, 1959; U.S. Pat. No. 3,312,765 issued to Scott on Apr. 4, 1967; and U.S. Pat. No. 3,235,289 issued to Jones on Feb. 15, 1966.

The Plauka et al patent relates to the fabrication of non-linear plastic pipe fittings. The technique disclosed therein involves mitering the edges of a plurality of plastic pipe sections so that when the mitered edges engage one another in complementary fashion, the pipe sections assume the shape of the desired fitting. The mitered edges are held in place while a liquid coating of an elastomeric resin such as a polyurethene elastomer is applied externally to form a permanent resilient coating or band.

The Prochaska patent relates to the fabrication of plastic fittings which two pipe sections are mitered and fitted on mandrels to form the desired fitting shape. The pipe sections are positioned in a high temperature and pressure mold while thermoplastic material is injected into the mold to surround the fitting joint. After the assembly is removed from the mold, the mandrels are withdrawn.

Pipes formed in the manner disclosed in Plauka et al and Prochaska would result in interfaces being created at the joints where the pipes abut, which interfaces are less resistant to chemical attack. Reinforcement can be provided by spraying or molding-on a liquid resin coating, but such a coating is not as strong as would be desired.

The Pertriaux patent relates to the fabrication of a plastic pipe fitting by providing a mandrel having the desired fitting shape and arranging glass fibers on the mandrel. The fibers and mandrel are encased within two half shells. A thermo-setting plastics material is injected into the half shells to coat the fibers. After the plastics material has set, the mandrel is removed.

The Noland patent relates to the fabrication of glass fiber reinforced plastic fittings. The technique involves the formation, in half sections, of a fitting formed of glass fiber reinforced resin material. After the half sections are fitted together, glass fiber is wound around the entire fitting and is then resin impregnated.

The Scott patent involves the fabrication of plastic pipe fittings. The technique involves forming straight sections of piping from a particle-formed polymeric material. These pipe sections are mitered and then installed on mandrels. The assembly is inserted in a high temperature pressure mold and fused. The mandrels are eventually withdrawn to produce the finished product.

The Jones patent relates to the formation of butt joints on plastic pipe. In this technique the pipe sections are cut square on the ends and abutted together. Pre-preged sheets of glass cloth impregnated with a thermal-setting resin are wrapped around the abutted ends. An irradiated polyethylene tape is spirally wound around the pre-preged sheet. The prepreged tape-wrapped pipes are heated to cure the resin of the prepreged sheet and bonded to the pipe sections.

Techniques such as disclosed above which involve extensive wrapping operations and/or the molding of a resin around formed parts, are relatively expensive, among other shortcomings. If joints are created which are exposed to the chemical being conducted, the fitting may be unduly susceptible to chemical attack.

It is, therefore, an object of the present invention to minimize or obviate problems of the type discussed above.

It is a further object of the invention to provide novel plastic pipe elements, such as fittings, flanges, and caps, and methods for producing same.

It is an additional object of the invention to provide novel composite plastic pipe elements which are durable, chemically resistant, and relatively inexpensive to manufacture.

A further object of the invention is to enable such elements to be formed without a manual filament winding operation.

SUMMARY OF THE INVENTION

These objects are achieved by the present invention which involves a plastic pipe element and method of making same. In practicing the invention, a liner of thermoplastic material is formed which includes at least one cylindrical leg having a free outer end and an inner end disposed intermediate opposite ends of the liner. At least one pipe section is formed comprising an inner thermoplastic lining and a fiber reinforced outer layer. That pipe section is bonded to an outer surface of the cylindrical leg such that an inner end edge of the pipe section overlies the liner. A sheet of fiber reinforced thermosetting resin molding compound is applied externally around the inner end edge of the pipe section and is subjected to pressure and heat to form the sheet into a desired shape. Thereafter, the sheet is allowed to harden.

THE DRAWINGS

The objects and advantages of the invention will become apparent from the following detailed description of preferred embodiments thereof, in connection with the accompanying drawings in which like numerals designate like elements, and in which:

FIGS. 2A–2C are longitudinal sectional views sequentially depicting the steps in forming the T-fitting of FIG. 1, wherein FIG. 2A depicts the molded inner liner;

FIG. 2B depicts three pipe sections mounted on the liner; and FIG. 2C depicts a reinforcing layer covering the juncture of the pipe sections;

FIG. 5 is a longitudinal sectional view through another form of plastic pipe element according to the present invention, viz., a 90° fitting;

FIG. 6 is a longitudinal sectional view through another form of plastic pipe element according to the present invention, viz., a reducer fitting;

FIG. 7 is a longitudinal sectional view through another form of plastic pipe element according to the present invention, viz., a 45° fitting; and FIG. 8 is a longitudinal sectional view through another form of plastic pipe element according to the present invention, viz., a closure cap.

FIG. 9 is an enlarged fragmentary sectional view of a plastic pipe element according to the present invention taken along the plane IX—IX of FIG. 1.

DETAILED DESCRIPTION OF PREFERRED EMBODIMENTS OF THE INVENTION

Figure 1:
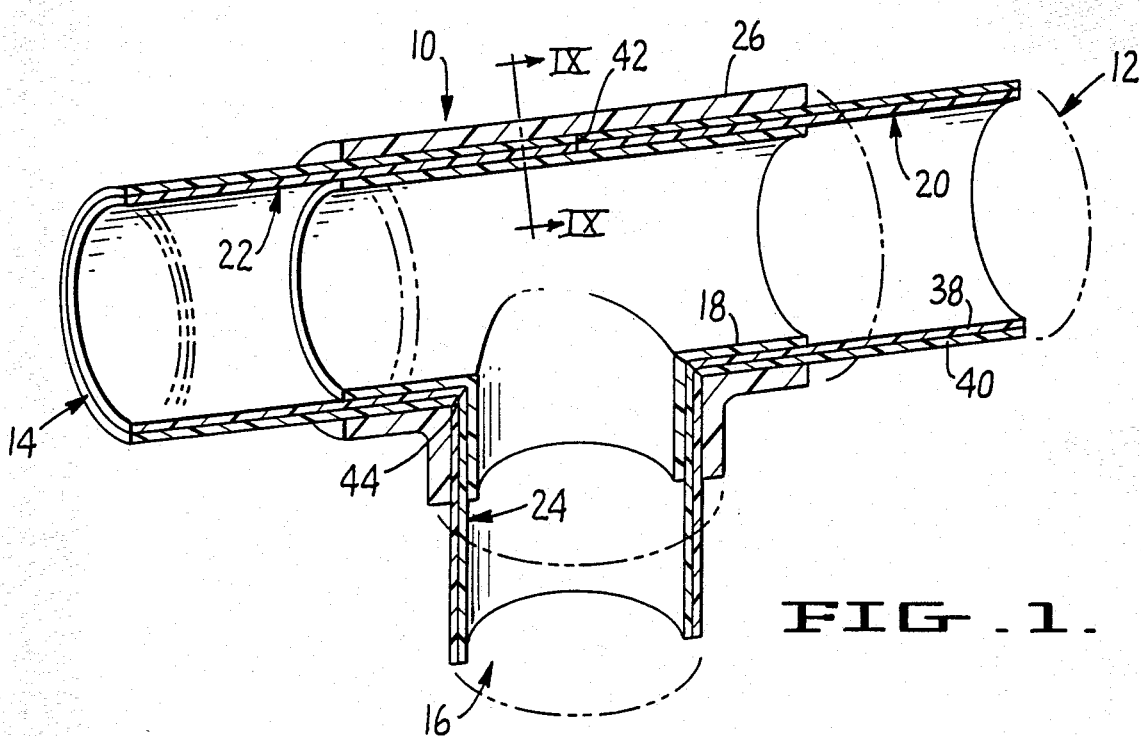
FIG. 1 is a perspective view of one form of plastic pipe element according to the present invention, viz., a T-fitting which is cut away in longitudinal section.
Figure 2:
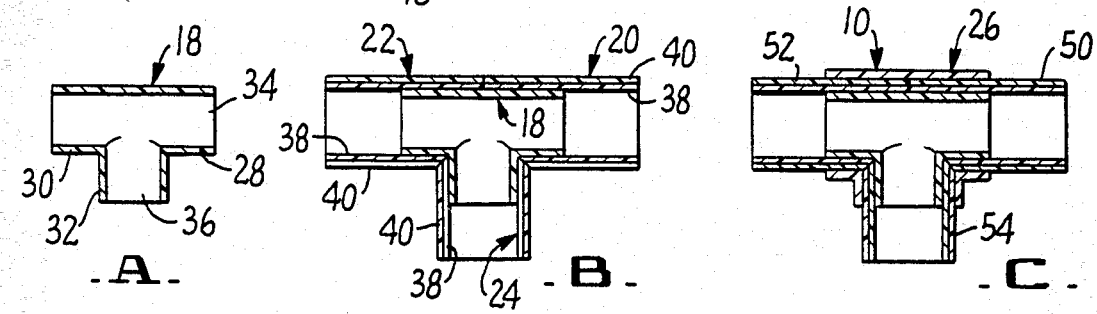

One preferred plastic pipe element according to the present invention comprises a pipe fitting 10 depicted in FIGS. 1 and 2C. Such a fitting 10 constitutes a T-fitting having three fluid passages 12, 14, 16 of circular cross-section.

Basically, the fitting comprises an internal threeway liner element 18, three intersecting pipe sections 20, 22, 24 mounted on the liner, and an outer reinforcement layer 26 surrounding the intersection of the pipe sections.

The internal liner element 18 (FIG. 2A) comprises a one-piece molded member of suitable thermoplastic material such as PVC or CPVC, for example, which exhibits a high degree of chemical resistance, especially to acids and alkalines.

The liner element is of T-shaped configuration, comprising three legs 28, 30, 32, first and second ones 28, 30 of which are coaxially aligned to define a first fluid passage 34, and the third 32 forming a second fluid passage 36 disposed at a right angle to the first passage 34. The legs intersect at a location intermediate the ends of the liner.

The three intersecting pipe sections 29, 22, 24 are of dual-layer, composite construction, including an inner lining 38 and an outer layer 40. The inner lining is formed preferably of the same thermoplastic material as the one-piece liner element 16, e.g., CPVC, PVC, etc. In practice, the pipe sections 20, 22, 24 are formed by molding the inner lining 38 as a thin wall thermoplastic extrusion. The extruded lining is mounted on a mandrel which is capable of being rotated at programmed speeds for the conventional winding of the outer layer 40 40 which comprises one or more plies of glass filaments 51 shown in FIG. 9 saturated with uncured thermosetting resins. These filaments are preferably wound helically at an angle most preferably of ±54.75 degrees. Upon curing and removal of the mandrel, the filament layer 40 and lining 38 form a unitary composite pipe section dimensioned such that the inner diameter thereof is slidable over the outer diameter of a respective leg 28, 30, 32 of the liner member 16.

To assemble the lined pipe sections 20, 22, 24 onto the liner member 18, one section 24, e.g., a "stem" section, is mitered at 45° at one of its circular ends and is inserted over the third leg 32 of the liner member. The other two pipe sections 20, 22 are abutted to form an interface 42 which extends circumferentially less than 360° because each of those two pipe sections 20, 22 has an opening cut in its side wall at the pipe inner end, which opening is mitered at a 45° angle at 44. Those two pipe sections 20, 22 are inserted over the first and second legs 28, 30, respectively, of the liner member 18 such that the mitered edges 44 of the openings abut the mitered edge of the stem section 24, whereby the circular openings form a center axis aligned with the axis of the stem section 32. A suitable solvent cement is applied to the outside surfaces of the legs 28, 30, 32 prior to insertion of the pipe sections 20, 22, 24. Upon hardening of the cement, the inside surfaces of the pipe linings 38 are permanently bonded to the outer surface of the liner member 18.

The reinforcement layer 26 constitutes a sheet of glass reinforced thermosetting resin molding compound. Such material can be a thermosetting polyester resin such as that made for example by Owens-Corning Fiberglas Corporation under the designation SMC II. Material of this nature is typically produced by passing polyethylene film under a doctor blade which deposits a controlled thickness of thermosetting resin onto the film. Continuous glass fiber strands having been passed through a chopper are deposited in random orientation onto the thermosetting resin layer. A second polyethylene film carrying a second controlled thickness of thermosetting resin is placed atop the chopped glass. This "sandwich" of two carrier films, thermosetting resin layers, and chopped glass 27 (FIG. 9) is passed between a series of roller pairs which compact the sandwich, squeeze out entrapped air, and wet the glass with the resin. The compacted sandwich is then rolled-up and stored at a controlled temperature to allow the resin to chemically thicken to a prescribed viscosity.

The sheet molding compound is cut into a pattern which enables it to be manually applied over the T-insertion formed by the pipe sections 20, 22, 24, so as to externally surround all inner end edges 42, 44 of the pipe sections, while leaving outer ends 50, 52, 54 of the pipe sections exposed.

The fitting is then placed in a suitable compression mold which heats and forms the sheet molding compound to the final configuration. That is, the mold comprises substantially identical half sections which together form a recess in the desired shape of the reinforcement layer. The sections come together in a plane containing the axes of the three pipe sections and are heatable in conventional fashion to heat the sheet molding compound while subjecting it to sufficient pressure to form the heated and pliant compound into its final form. Preferably, the sheet molding compound is subjected to a temperature of about 220° F.

It will be appreciated that fittings can be massproduced relatively inexpensively in this manner while exhibiting a high degree of strength and chemical resistance. The chemical resistance is provided by the thermoplastic pipe lining 38 and the liner member 18 which form a continuous, uninterrupted thermoplastic internal barrier. The edge joints 42, 44 between the various pipe sections are covered by the liner member 18 to prevent attack upon those joints by chemicals which are conducted. A high level of strength is provided by the use of filament wound pipe 40 reinforced by the layer 26 of glass-reinforced thermosetting resin molding compound. The latter is formed without the need for a conventional hand-winding procedure which would be relatively expensive. The ends of the pipe sections are conveniently left exposed for connection to other conduit parts.

Examples of additional pipe elements which can be formed by the present invention are depicted in FIGS. 3 to 8.

It will be appreciated that the internal liners, pipe sections, and reinforcement layers disclosed in connection with the following modifications are fabricated in the manner disclosed earlier herein.

In FIG. 7, a 45° fitting 60 is depicted which includes a molded, one-piece internal liner member 62 having first and second legs 64, 66 oriented at a 45° angle relative to one another.

A pair of thermoplastic lined pipe sections 68, 70 are provided which are separately inserted over respective ones of the legs 64, 66, and bonded thereto. A mitered joint 72 between the pipe sections 68, 70 are covered on the inside by the thermoplastic liner member 62, and on the outside by a reinforcement layer 74 of glass reinforced thermosetting resin molding compound which externally surrounds the intersection of the pipe sections. The ends of the pipe sections project beyond the resin molding compound to accommodate bonding thereof to upstream and downstream pipe elements.

In FIG. 5 there is depicted a 90° fitting 80 which directs conducted fluid to a pair of 45° turns. A one-piece interior thermoplastic liner 82 includes a pair of end legs 84, 86 joined to an intermediate portion 88. The legs 84, 86 each extend at a 45° angle relative to the intermediate portion 88 and at a 90° angle relative to one another. Three thermoplastic lined pipe sections 90, 92, 94 are bonded to the outside of the liner member 82. An intermediate one 92 of the pipe sections is initially installed over the intermediate portion 88 of the liner 82 and is bonded thereto. The end pipe sections 90, 94 are installed over the legs 86, 84 of the liner member 82 and are bonded thereto while abutting the intermediate pipe section 92 along mitered edges 96, 98. A reinforcement layer 100 of glass reinforced thermosetting resin molding compound surrounds the intersections formed by the end pipe sections 90, 94 and the intermediate pipe section 92.

In FIG. 6 a further modification is depicted of a reducer type fitting 110 which conducts fluid between larger and smaller conduit diameters 12, 114, respectively. A one-piece thermoplastic internal liner 116 includes a pair of coaxial legs 118, 120 of different diameter. A bridging portion 122 of the liner member which joins the legs forms a pair of axially spaced, annular shoulder surfaces 124, 126 each disposed in a plane perpendicular to the longitudinal axis of the fitting. A 45° mitered edge 128 interconnects those shoulders. A pair of thermoplastic lined pipe sections 130, 132 of large and small diameter are installed over the large and small diameter legs 118, 120, respectively, of the liner member. The ends of the pipe sections are not mitered, and abut against the shoulders 124, 126 of the bridging portion 122 of the liner member 116. The juncture where the pipe sections come together is covered by a reinforcement layer 134 of glass reinforced polyester resin molding compound which, when formed, presents a 45° edge in abutment with the 45° miter 128 of the liner member 116. The joints formed by engagement between the pipe sections 130, 132 and the liner member 116 are covered on the inside by the liner member 16 on the outside by the reinforcing layer 134.

Figure 3:
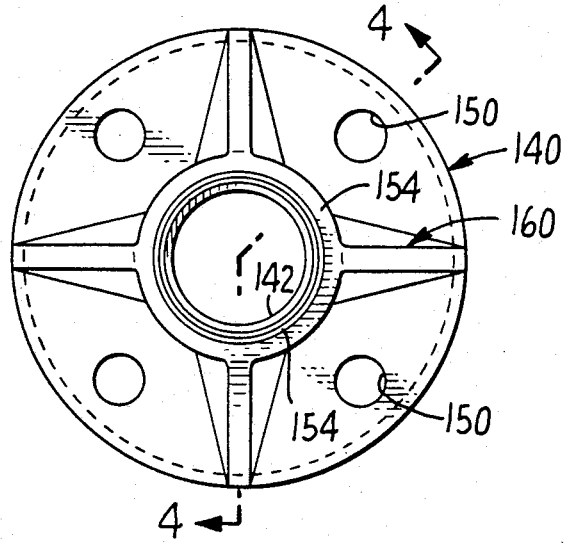
FIG. 3 is a front view of another form of plastic pipe element according to the present invention, viz., a plastic pipe flange.
Figure 4:
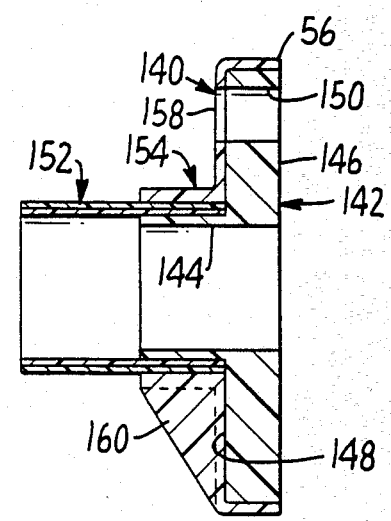
FIG. 4 is a longitudinal sectional view taken along line 4—4 of FIG. 3.

In FIGS. 3-4, a modification is disclosed wherein a pipe element according to the present invention constitutes a flange 140 adapted for connection to a corresponding flange of another pipe element (not shown). The flange 140 comprises a one-piece molded liner 142 having a cylindrical leg 144 and an integrally formed lateral extension 146 of disc-like configuration. The leg 144 terminates at the lateral disc and thus has its inner end disposed intermediate the ends of the liner. The extension includes an abutment face 148 extending radially outwardly from an inner end of the leg. The lateral disc includes a plurality of apertures 150 suitable for receiving mounting bolts or the like for connection to another flange. A thermoplastic lined pipe section 152 is installed over the leg portion 144 of the liner member 142 and is bonded thereto. An inner end edge of the pipe section bears against the abutment face 148, thus forming a joint therewith. Surrounding the juncture of the pipe section and liner member 142 is a reinforcement layer 154 of glass reinforced thermosetting resin molding compound. The reinforcement layer 154 extends along a portion of the pipe section 152, along the entire abutment face 142 of the liner member, and along a circular periphery 156 of the lateral extension. Apertures 158 are formed in the reinforcement layer 154 in alignment with the apertures 150 in the liner member 142. The reinforcement layer includes gussets 160 disposed circumferentially between the apertures to strengthen the flange.

In FIG. 8 there is depicted a modification of a pipe element in accordance with the present invention which constitutes a closure cap 170 capable of blocking-off one end of a pipe element. The cap comprises an internal one-piece liner 172 of thermoplastic material. The liner member 172 is of generally cup-shaped configuration having a cylindrical leg 174 and an integral semispherical closure wall 176 at one end thereof. The semispherical wall decreases in thickness from the end of the leg to the peak 178 of the semisphere. At the juncture of the semi-spherical wall with the leg, the liner member includes a circular abutment face 180 against which the inner end edge of a thermoplastic lined pipe section 182 abuts. The pipe section 182 is inserted over the leg 174 and is bonded to an outer surface thereof. Surrounding this joint 180 is a reinforcement layer 184 of glass reinforced thermosetting resin molding compound. The compound completely surrounds the semisphere 176 and encases the joint 180 formed by the shoulder 180 and the pipe section 182.

It will be appreciated from the foregoing that in fittings, flanges, and/or caps produced in accordance with the present invention, the interior or fluid-contacting portion of the element is defined by a continuous uninterrupted thermoplastic barrier which resists chemical attack. This barrier is formed by the liner member and the lining of the composite pipe section. The joint formed by the end of the pipe section(s) and the member against which it abuts is shielded both internally and externally. Internally, such joint is covered by the thermoplastic liner, and externally by the sheet molding compound. Thus, such joint is completely impervious to chemical attack. Moreover, the glass-reinforced outside layer provides substantial reinforcement for the joint. The fitting strength is also increased by the wound filaments of the outer ply of the pipe sections.

Although the invention has been described in connection with preferred embodiments thereof, it will be appreciated by those skilled in the art that modifications, substitutions, additions, and deletions may be made without specifically departing from the spirit or scope of the invention as defined in the appended claims.

What is claimed is:

1. A method of forming a pipe fitting comprising the steps of:
   A. forming a liner of thermoplastic material which defines a fluid passage therethrough;
   B. forming at least first and second pipe sections, each pipe section being formed by embedding a plurality of reinforcement fibers in an outer layer of thermosetting resin such that said fibers are encompassed within said resin layer and bounding said outer layer to an inner lining of thermoplastic material;
   C. bounding said first pipe section onto an outer surface of a first section of said liner such that an end edge of said first pipe section overlies said liner;
   D. bonding said second pipe section onto an outer surface of a second section of said liner such that an end edge of said second pipe section overlies said liner;
   E. forming an external reinforcement sheet by embedding a layer of reinforcement fibers in a layer of thermosetting, resin such that said fiber layer is encompassed within said resin sheet; and
   F. bonding said external reinforcement sheet to the exterior surfaces of said pipe sections, covering said end edges.

2. The method of forming a pipe fitting as recited in claim 1 which further includes the steps of:
   subjecting said external reinforcement sheet to pressure and heat after it is applied to said pipe section end edges to form said sheet into a desired shape, and
   allowing said sheet to cure.

3. A method according to claim 2, wherein said liner is formed of one-piece.

4. A method according to claim 1, wherein said pipe sections are bonded in said steps C and D such that said pipe end edges abut one another.

5. A method according to claim 1, wherein said pipe sections are bonded in steps C and D such that said pipe end edges abut said liner.

6. A method according to claim 1 or 3, wherein said sheet is applied so as to leave outer ends of said pipe sections exposed.

7. A method according to claim 1 including the step of mitering said end edges.

8. A method according to claim 1, wherein said step A comprises forming a T-shaped liner having three legs, said step B comprises forming three pipe sections which are bonded to respective ones of said legs such that the end edges of said pipe sections abut one another.

9. A method according to claim 1, wherein said step A comprises forming a liner having two legs mutually disposed at an acute angle, said step B comprises forming two pipe sections which are bonded to respective ones of said legs such that end edges of said pipe sections abut one another.

10. A method according to claim 1, wherein said step A comprises forming a liner having two legs extending from opposite ends of an intermediate section, each said leg forming an acute angle with said intermediate section and forming a right angle with one another, said step B comprising forming three pipe sections which are bonded to respective ones of said legs and intermediate section such that end edges of said pipe sections abut one another.

11. A method according to claim 1, wherein said step A comprises forming a liner having first and second coaxial legs of different inner diameter and a bridging section interconnecting said legs, said bridging section including a pair of shoulders, said step B comprising forming two said pipe sections which are bonded to respective ones of said legs such that end edges of said pipe sections abut said shoulders.

12. A method of making a plastic pipe element comprising the steps of:
   A. forming a liner of thermoplastic material such that said liner includes at least one cylindrical leg having a free outer end and an inner end disposed intermediate opposite ends of said liner;
   B. forming at least one pipe section by embedding a plurality of reinforcement fibers in an outer layer of thermosetting resin such that said fibers are encompassed within said resin layer and bonding said outer layer to an inner lining of thermoplastic material;
   C. bonding said pipe section to an outer surface of said cylindrical leg such that an inner end edge of said pipe section overlies said liner;
   D. forming an external reinforcement sheet by embedding a layer of reinforcement fibers in a layer of thermosetting resin such that said fiber layer is encompassed within said resin; and
   E. bonding said external reinforcement sheet to the exterior surface of said pipe section, covering said end edge.

13. The method of forming a pipe fitting as recited in claim 12 which further includes the steps of:
   subjecting said external reinforcement sheet to pressure and heat after it is applied to said pipe section end edges to form said sheet into a desired shape, and
   allowing said sheet to cure.

14. A method according to claim 13, wherein said step A includes forming said liner with an abutment face extending radially outwardly from said inner end edge of said liner, and said step C includes bonding said pipe section such that said inner end edge abuts said abutment face.

15. A method according to claim 14, wherein said step A comprises forming said abutment face as a portion of a flange adapting said pipe element for connection to another pipe element.

16. A method according to claim 14, wherein said step A comprises forming said liner with a closure wall blocking-off one end of said pipe section.

17. The method as recited in claim 16 which further includes bonding said external reinforcement sheet to the exterior surface of said closure wall.

18. A method according to claim 12, wherein said step A includes forming said liner with first and second legs, and said step B includes forming first and second pipe sections, said step C includes bonding said second pipe section to an outer surface of said second leg such that an inner end edge of said second pipe section overlies said liner, and said step D includes applying said sheet to overlie said inner end edge of said second pipe section.

19. The method according to claim 18 which further includes providing said second leg with a narrower fluid passage than said first leg.

20. The method according to claim 18 which further includes the step of positioning said second leg at an obtuse angle with respect to said first leg.

21. A method of forming a plastic pipe fitting comprising the steps of:
- A. forming a one-piece liner member of thermoplastic material, said liner including at least first and second legs defining a fluid passage through the liner member,
- B. forming at least first and second pipe sections, each pipe section being formed by embedding a plurality of reinforcement fibers in an outer layer of thermosetting resin such that said fibers are encompassed within said outer layer and bonding said outer layer to an inner lining of thermoplastic material;
- C. bonding said first pipe section onto an outer surface of said first leg of said liner member such that an inner end edge of said first pipe section overlies said liner member;
- D. bonding said second pipe section to an outer surface of said second leg such that an inner end edge of said second pipe section overlies said liner member;
- E. forming an external reinforcement sheet by embedding a layer of reinforcement fibers in a layer of thermosetting resin such that said fiber layer is encompassed within said resin layer and;
- F. bonding said external reinforcement sheet to the exterior surfaces of said pipe sections, covering said inner end edges.

* * * * *